United States Patent [19]

Rough

[11] 4,247,793
[45] Jan. 27, 1981

[54] ELECTRIC MOTOR

[75] Inventor: J. Kirkwood H. Rough, Toledo, Ohio

[73] Assignee: Jim Zeeger, Arlington, Va. ; a part interest

[21] Appl. No.: 574,146

[22] Filed: May 2, 1975

[51] Int. Cl.³ .............................................. H02K 41/00
[52] U.S. Cl. ........................................ 310/12; 310/229
[58] Field of Search ................................ 310/12–14, 310/15, 30, 229

[56] References Cited

U.S. PATENT DOCUMENTS

| 3,109,113 | 10/1963 | Henry-Baudot | 310/13 |
| 3,136,934 | 6/1964 | Henry-Baudot | 310/12 UX |
| 3,144,570 | 8/1964 | Crowley | 310/13 |
| 3,259,768 | 7/1966 | Burr | 310/13 |
| 3,886,385 | 5/1975 | Bacchialoni | 310/229 |

FOREIGN PATENT DOCUMENTS 1363416  5/1964  France ...................................... 310/12

Primary Examiner—Donovan F. Duggan
Attorney, Agent, or Firm—Jim Zegeer

[57] ABSTRACT

There is disclosed an improvement on the electric motor shown in applicant's Application Ser. No. 538,979. According to the present invention, the electrical energy is supplied to serpentine armature conductors by brush or commutator assemblies juxtaposed at the ends of the active portion of an incremented pole magnetic field assembly.

4 Claims, 5 Drawing Figures

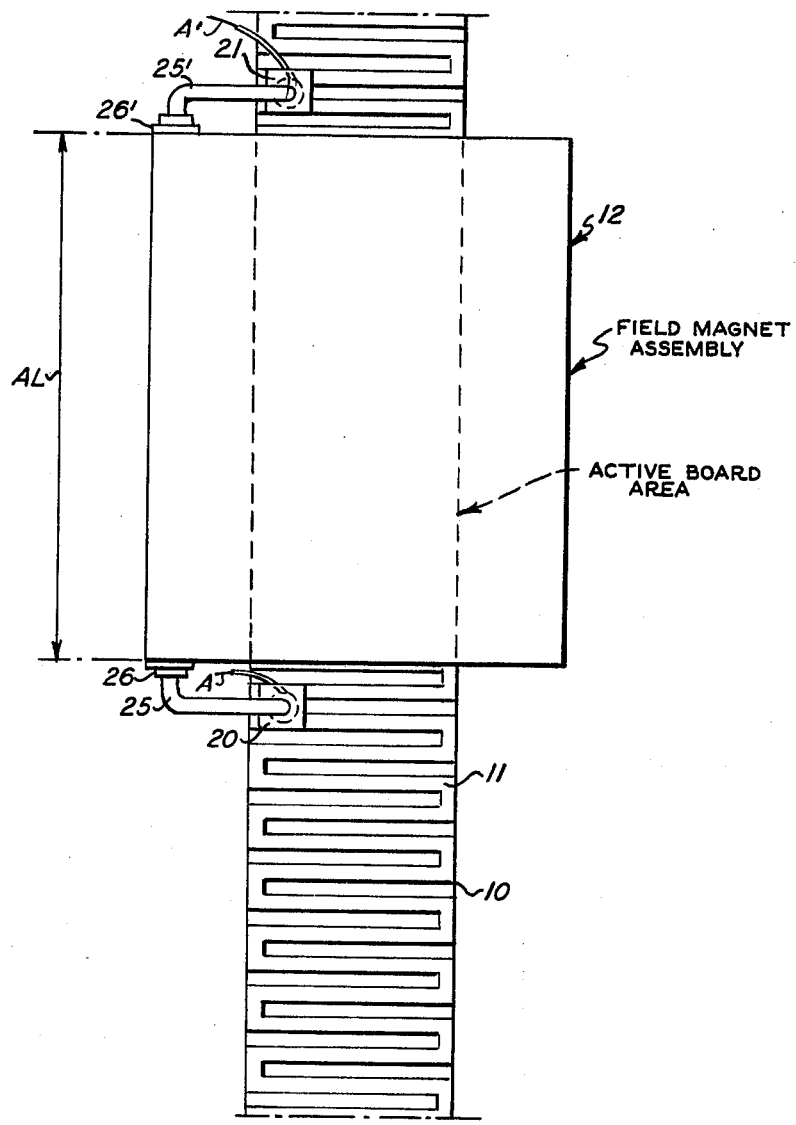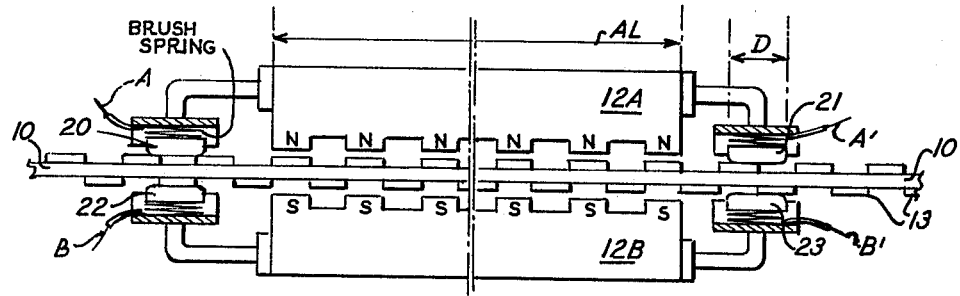

ELECTRIC MOTOR

BRIEF DESCRIPTION OF THE INVENTION

The present invention relates generally to an improved electric drive, and more particularly to an unique method and apparatus for supplying electrical operating energy to an electric motor having a pair of serpentine conductors on a non-conductive, non-magnetic carrier.

In my patent application Ser. No. 538,979, filed Jan. 6, 1975, I disclosed a basic improvement in low mass, low inertia, low inductance armature motors having infinite point resolution and a high force to mass ratio, the basic configuration being of a plurality of phase displaced armature windings having 90° phase displacement for even spaced increments and optimized linear force on a non-conductive, non-magnetic substrate sandwiched between an incremental, alternately polarized magnetic field or castellated single polarity pole structure. In that application, I disclosed various means for supplying electrical energy to the windings of the motor including direct connection to the serpentine connected transverse conductors and brushes contacting continuous conductive loops at the lateral edges of the carrier.

In accordance with the present invention, brush assemblies and provided through which only selected portions of the transverse conductors on a flexible or stiff substrate actuator are energized and, preferably, only within the area defined by the stator field magnet, thus preventing energy loss in the magnetic alternating fields outside of the stator field area. According to the invention, the serpentine windings are contacted by brushes so that as the carrier is moved into or out of different positions with respect to the permanent magnet structure, the brushes contact only those conductors juxtaposed adjacent to the ends of the active area of an incremented magnetic field structure. In particular, the magnetic means is constituted by a plurality of consecutive permanent magnetic pole elements or pieces which define an active drive area and only selected portions of the pairs of windings within the active portions are excited by the brushes. The conductor portions outside the active area are not energized with current. In a further aspect of the invention, each of the conductor arrays is constituted by parallel conductors joined by end portions which form a serpentine path as disclosed in my Application Ser. No. 538,979, filed Jan. 6, 1975. In the present invention, I utilize brush means at the ends of the active area of magnetic field structure or at least at the ends of the spaced apart number of selected conductors to define a selected portion of the conductor winding which selected portion varies according to the position of the armature in the active magnetic field area.

BRIEF DESCRIPTION OF THE DRAWINGS

The above and other objects, advantages and features of the invention will become more apparent from the following specification when considered with the accompanying drawings wherein:

FIG. 1 is a top plan view of a stepping motor incorporating the invention,

FIG. 2 is a side elevational view of the same motor incorporating the invention.

DETAILED DESCRIPTION OF THE INVENTION

Figure 4:
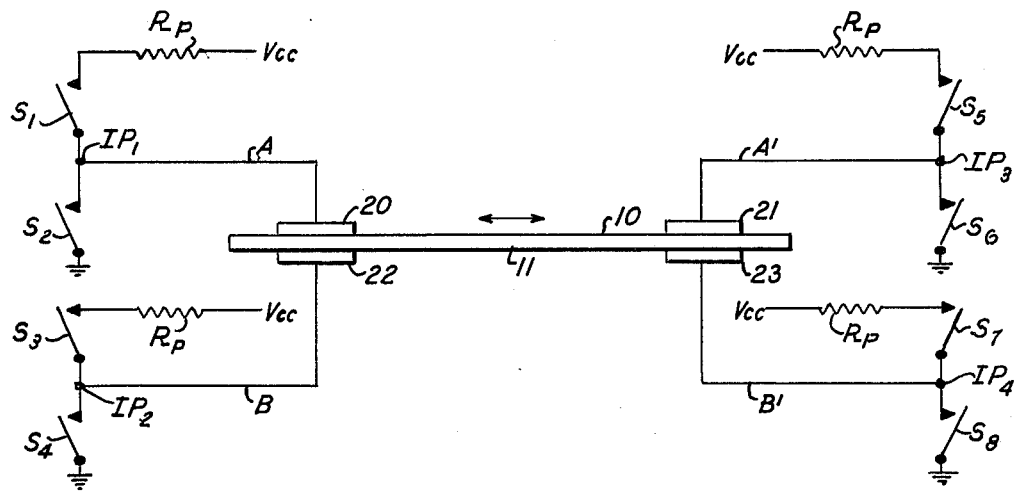

Referring to FIGS. 1 and 2, there is shown a substrate 10 which may be flexible or stiff which carries on the upper surface thereof a serpentine conductor pattern 11, the opposite surface carrying a companion serpentine conductor pattern 13 thereon in 90° phase displaced relation with respect thereto, all as described in greater detail in my above-referenced patent application. In addition, an upper magnetic field assembly 12 is diagrammatically illustrated as having an active length AL which, in the present invention, also defines the active length of the armature portion which is to be in driving force generating relation with respect to the permanent magnet field assembly structure. As shown in the cross sectional view of FIG. 2, the lower serpentine conductor structure is displaced 90° with respect to the upper conductor structure. Preferably, but not necessarily, the conductors are printed circuit conductors formed using conventional printed circuit techniques. As noted later herein, surfaces contacted by brushes may be treated to improve current transfer properties as well as to reduce wear.

Four carbon brush assemblies 20, 21, 22 and 23 are utilized to supply electrical operating energy to the upper serpentine conductor 10 and the lower serpentine conductor 13 (see FIG. 2). In the arrangement illustrated in FIG. 1, the brush assembly 20 is mounted by a spring holder 25 which is secured by an insulating fitment 26 to the upper field magnet assembly 12. As shown in FIG. 2, in the preferred embodiment, each brush 20 has a length D such that the brush makes electrical contact with either adjacent conductor traverse or both adjacent conductors traverse before breaking electrical connection from the conductor in contact with the brush. In this way, since the conductors are connected at their ends by the serpentine connection, there is no arcing or sparking of any kind due to the shifting of the brush 20 from contact with the different lateral conductor segments forming the serpentine upper conductor. The same is true in connection with brush 21 for the upper conductors. In connection with the lower conductors 22, these brushes are in like contact with the lower serpentine conductors 13, there being two brushes 22 and 23.

Since there are disadvantages mechanically with respect to brushes, direct electrical connection to the phase conductor arrays may be required all as disclosed in my above-identified patent application. Direct termination in the form of low mass, e.g., flat flexible cables, for example, and the flexible cabling increases the mechanical life of an actuator and reduces the mechanical complexities. However, if the actuator is twice as long as the active stator length AL half of the driving energy can be lost, and magnetic shielding may become necessary in some working environments. Thus, the present invention has the advantage of reducing the amount of electrical energy required to achieve the same driving force with a relatively long armature assembly and avoiding magnetic shielding of the armature assembly beyond the magnetic field structure.

Referring again to FIG. 1, it will be noted that the brush 20 is shown as located to the left side of the armature but it will be appreciated that the brush may be located in the center or to the right side, the preferred brush position being at the edge of the circuit board. The reason for the preferred position being located at the edge of the circuit board is to assure that any wear is at the edge of the armature instead of in the center so the transverse magnetic fields set up by the traversals of the serpentine conductor arrays will not be in any way diminished by the wear of the brush upon the surface of the conductor. Moreover, these lateral edges can be provided with heavy copper coating, or other brush contacting surfaces for the purpose of assuring a good, long life electrical contact by the brushes. It is apparent that one would not go beyond the scope of the invention by providing brushes connected in parallel at both lateral edges or, in fact, the brush structure may encompass the entire width of the armature.

Figure 3:
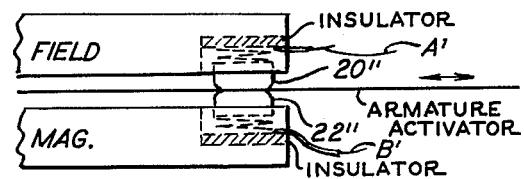
FIG. 3 is a cross sectional view of a brush mounting within the magnet assembly, FIG. 4 corresponds to the FIG. 3 of my above-identified application showing the application of the driving potential to the brush structure.

Referring now to FIG. 3, the brushes can be inset into the magnetic stator cage to prevent active half loop from extending beyond the ends of the field assembly. Thus, the entire magnetic active portion of the motor assembly may be enclosed within the field magnet assembly.

It will be appreciated that the basic operative drive force of the invention as developed for driving a load is in the utilization of a pair of serpentine wound conductor windings phase displaced with respect to each other and preferably on a non-conductive and/or non-magnetic substrate sandwiched between an incremental, alternately polarized magnetic field or castellated single polarity pole structure. The phase windings may be 90° phase displaced for even spaced increments and for optimized linear force for driving purposes.

The magnetic detent means formed by the combination of the polarized magnetic fields and the permanent magnets forms the combination of attractive magnetic detent means and repulsive magnetic detent means all as described in detail in my above-referenced application. Moreover, the driving relationships established by these combinations of elements are also as described in my above-referenced patent application which are driven by the electrical supply means shown in FIG. 4 (corresponding somewhat to FIG. 3 of my referenced application). In FIG. 4, windings 10 and 11 are illustrated as connected through brushes 20, 21, 22 and 23 to an electrical supply system constituted by a direct current supply $V_{cc}$ and switches S1, S2, S3, S4, S5, S6, S7 and S8. Each switch pair, S1-S2, S3-S4, S5-S6, S7-S8, is connected via small protective resistor $R_p$ across the $V_{cc}$ supply and common ground and has an intermediate point $IP_1$, $IP_2$, $IP_3$, and $IP_4$, respectively, connected to the brushes 20 and 21, 22 and 23 of windings 10 and 11, respectively. Switches S1, S2, S3, ..S4 may be manually operated to effect a step movement of the armature relative to the magnetic field structure. When switch S1 is operated closed, switch S6 is also closed to provide a current path from the source $V_{cc}$, resistor $R_p$, switch S1, intermediate point IP and brush 20, and the portion of the winding 11 immediately there in contact therewith, through the winding portion of winding 11 between the active portions of the magnetic field structure to the portions of the serpentine winding 10 under the brush 21, intermediate point $IP_3$, switch S6 and ground. Switches S1 and S6 have been opened, and switches S5 and S2 may be closed to provide a current path from the supply $V_{cc}$, resistor $R_p$, switch S5, intermediate point $IP_3$, brush 21 and that same intermediate portion of winding 11, brush 20 and intermediate point IP and switch S2 to ground. In this case, the current having reversed direction of flow, the magnetic field around the elongated active portions of the winding 11 were reversed, the actuation of switches S3-S4 and S7-S8 for winding 12 will provide, in relation to the active portions of each winding and the magnetic field structure, similar attractive and repulsive detent elements.

The motive force produced is related to the field strength of the magnetic fields and the number of magnetic detents formed. In the present invention, these will lie in the area between the active length AL of the magnetic field structure.

As in the case of my earlier application, if closed loop operation is desired, the position of the armature as well as the position changes may be sensed in any number of well known ways and used as a feed back to the source of control signals. For example, the armature substrate can be transparent and a spot of light may be projected through code marks printed thereon to a transducer which supplies its output to the source of control signals, which may be a computer, typewriter keyboard, etc. Moreover, the serpentine windings themselves may be used for this purpose.

Figure 5:
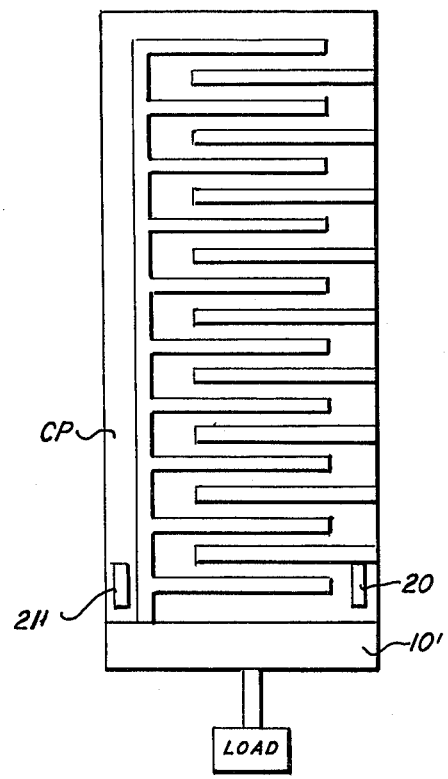
FIG. 5 is a modification of the conductor pattern-brush arrangement.

In FIG. 5, I show brushes 20' and 21' located at the same end of substrate 10', substrate 10' being coupled to an exemplary load device. In this case the upper end of conductor 10' is returned by conductor path CP on the left edge 17 of substrate 10'.

Although the invention has been disclosed and illustrated with respect to a number of embodiments along with applicant's preferred embodiment, it will be apparent to those skilled in the art that the invention is of wide application and therefore is limited only as indicated by the scope of the claims appended hereto.

I claim:

1. In an electric motor having magnetic means forming at least one polarized magnetic field having an elongated dimension transverse to a selected direction of drive, a pair of conductor arrays, each conductor array including a plurality of parallel, elongated conductor elements spaced apart with respect to each other along said selected direction of drive, and a thin flat non-magnetic carrier for said conductor arrays and means maintaining said carrier for movement along a path defined by said selected direction, the improvement comprising each elongated conductor element in said arrays being constituted by a conductive path formed on said non-magnetic carrier and having means constituting current input ends, each said conductor array being separate from the other, respectively, and printed on said thin flat carrier, brush means for applying electrical energy to a selected number of said elongated conductor elements in each of said arrays via said current input ends to energize said selected conductor elements, the remaining of said elongated conductor elements in each array remaining unenergized and not having any energizing current flow therein and, wherein each said conductor array is constituted by a parallel conductors transverse to said direction of drive and alternate ones of said lateral end terminations are connected to each other to form a serpentine conductor, and said brush means has a length in the direction of drive to span the space between a pair of parallel conductors.

2. The invention defined in claim 1 wherein said magnetic means is constituted by a plurality of consecutive permanent magnet pole pieces defining an active drive area, and the selected number of said current input ends are on conductor elements within said active drive area, and successive ones of said conductor elements in said arrays are moved into said active area.

3. The invention in claim 1 wherein said brush means is located at one edge of said carrier.

4. The invention defined in claim 1 wherein said brush means is located within the active area of said magnetic field assembly.

* * * * *